United States Patent [19]
Hall et al.

[11] 3,929,701

[45] Dec. 30, 1975

[54] BINDERS FOR PRINTING INKS

[75] Inventors: Claude E. Hall, Alma; Louis L. Stalvey, Baxley, both of Ga.

[73] Assignee: Monsanto Company, St. Louis, Mo.

[22] Filed: Sept. 16, 1974

[21] Appl. No.: 506,484

[52] U.S. Cl............... 260/23 ST; 106/28; 260/23 S; 260/27 R; 260/29.6 R
[51] Int. Cl.[2] .......................................... C08L 91/00
[58] Field of Search .......... 260/23 ST, 23 S, 88.1 R, 260/27 R, 22 CQ, 29.6 R; 106/28

[56] References Cited
UNITED STATES PATENTS

| | | | |
|---|---|---|---|
| 2,894,938 | 7/1959 | Chapin | 260/235 |
| 2,940,946 | 6/1960 | Shokal | 260/235 |
| 2,962,462 | 11/1960 | Chapin | 260/235 |
| 3,660,329 | 5/1972 | Wysocki | 260/22 CQ |

*Primary Examiner*—Lewis T. Jacobs
*Attorney, Agent, or Firm*—N. E. Willis; H. B. Roberts; F. D. Shearin

[57] ABSTRACT

Binders for printing inks comprising an ester of a styrene allyl alcohol copolymer.

9 Claims, No Drawings

BINDERS FOR PRINTING INKS

BACKGROUND OF THE INVENTION

This invention relates to binders for printing inks and to ink vehicles and inks containing such binders. More particularly, the invention relates to binders for flexographic or gravure printing inks in which water is the major volatile component.

DESCRIPTION OF THE PRIOR ART

The printing ink industry has long recognized the use of water instead of conventional volatile organic solvents as the volatile component in inks would have many advantages if suitable printing quality could be obtained. Among such advantages would be economy, less odor, less toxicity, less fire hazard, and easier and cheaper clean-up of printing press and equipment.

Although there have been many disclosures of water base inks in the past, the binders in these inks have not met expectations. For example, acrylic resin binders tend to cause excessive foaming and have poor solvent release properties. Addtionally, because of the energy crisis, acrylic resins are in short supply and consequently, very expensive.

In some printing ink formulations, acrylic resins are used in combination with natural resins. However, this is disadvantageous in that the ink manufacturer has to utilize more than one resin.

Consequently, a binder for printing inks that could be used to replace acrylics or a combination of acrylics and natural resins would be an advancement in the art.

BRIEF DESCRIPTION OF THE INVENTION

It was surprisingly found that binders for printing inks of this invention are as good or better than acrylic resin binders in water based flexographic or gravure printing inks. These binders comprise a major amount of an ester of a copolymer of an ethylenically unsaturated alcohol and a styrene monomer; such esterified copolymer being a copolymer of:

A. an ethylenically unsaturated alcohol selected from the group consisting of allyl alcohol, methallyl alcohol, and mixtures thereof, and B. a styrene monomer selected from the group consisting of styrene, alpha- and beta-substituted styrene, ring substituted mono- and di-alkyl, chloro- and chloroalkyl styrene and mixtures thereof wherein said copolymer, before esterification, has a hydroxyl content of from about 4–7.5% by weight;

from 50–85% of said hydroxyl groups being esterified with

C. a rosin material, and from 1 to 10% of said hydroxyl groups being esterified with D. a modified drying oil said binder having an acid number of from 70 to 225 and a melting point of from about 115° to 160°C.

In addition to being a suitable replacement for acrylics, the binders of this invention can be used as a replacement for a combination of acrylics and natural resins. They are also compatible with other binders. Water based inks containing these binders are low foaming and have a low viscosity, consequently they can carry more pigment or filler. Also, they provide good grease and detergent resistance, as well as solvent release, wet rub and gloss properties.

As mentioned, the invention is also directed to ink vehicles and inks containing such binders. Additionally, the invention is directed to a method for preparing such binders, vehicles and inks, and to a method of using such inks.

DETAILED DESCRIPTION OF THE INVENTION

As mentioned, the esterified copolymers of this invention are copolymers of from 60 to 85% by weight of styrene and correspondingly from 40 to 15% by weight of an ethylenically unsaturated alcohol. The actual hydroxyl group content of the aforesaid copolymers (before esterification) will not always conform to the theoretical content calculated from the relative proportions of styrene monomer and ethylenically unsaturated alcohol due to possible destruction of hydroxyl groups during copolymerization. In general, however, copolymers containing from about 4.0 to 7.5% hydroxyl groups by weight are within the scope of this invention. The styrene monomer moiety of said copolymer may be styrene, alpha- or beta-substituted styrene of a ring substituted styrene in whicn the substituents are 1–4 carbon atom alkyl groups or chlorine groups. Examples of such substituted styrenes include the ortho-, meta- and para-, methyl, ethyl, butyl, etc., monoalkyl styrenes; 2,2-2,4 dimethyl and diethyl styrene, mono-, di- and tri-chlorostyrenes; alkyl chlorostyrenes such as 2-methyl-4-chlorostyrene, alphamethyl styrene, etc. Mixtures of two or more such styrene monomer moieties may be present. The ethylenically unsaturated alcohol moiety may be allyl alcohol, methyl allyl alcohol, or a mixture thereof.

For the purposes of brevity and simplicity of discussion, the entire class of copolymers set forth in this paragraph shall hereinafter be referred to as styrene allyl alcohol copolymers.

The styrene allyl alcohol copolymers may be prepared in several ways (see for example, U.S. Pat. No. 2,940,946, which is incorporated herein by reference). It is most desirable to copolymerize the styrene and allyl alcohol components in a substantially oxygen-free system, thus minimizing the oxidative loss of hydroxyl groups. (See U.S. Pat. No. 2,894,938, which is incorporated herein by reference).

The rosin material with which the aforementioned styrene allyl alcohol copolymers are esterified includes abietic acid in substantially pure form and any of the usual types of rosins, such as wood rosin, gum rosin and tall oil rosin in a crude or refined state. It also includes disproportionated rosin, partially hydrogenated rosin, polymerized rosin, modified and/or fortified rosin.

Gum rosin is preferred, more preferably, fortified gum rosin made by reacting or mixing with the rosins varying amounts of maleic anhydride or acid or fumaric acid in the presence of a sulfonic acid catalyst. Maleic acid, maleic anhydride or fumaric acid is generally adducted in an amount of 1 to 30 percent, preferably 12 to 30 percent by weight, based on the weight of the rosin. Formaldehyde may be used to modify the rosin and, if so, it is used in an amount of 1 to 3 percent by weight, based on the weight of the rosin. For example, a formaldehyde modified and fumaric fortified gum rosin contains about 70 percent by weight of gum rosin and 30 percent by weight of an adduct of fumaric acid and gum rosin. A more detailed description for preparing a modified and fortified rosin can be found in U.S. Pat. No. 2,994,635, which is incorporated herein by reference.

Generally, 50 to 85% of the hydroxyl groups of the styrene allyl alcohol copolymers are esterified with a rosin material.

The modified drying oils with which the aforementioned styrene allyl alcohol copolymers are esterified are those drying or semi-drying oils having an iodine value of about 90 as determined by ASTMD 1467-57T. Such oils include linseed oil, soya oil, safflower oil, tung oil, tall oil esters, dehydrogenated castor oil, fish oil, and the like. These modified oils are addition products generally containing from about 3 to about 15 percent by weight of olefinic dicarboxylic acids or anhydrides thereof, usually maleic anhydride or fumaric acid. These drying oils are well known in the art and can be prepared by the usual procedures, for example as described in U.S. Pat. Nos. 2,188,882 – 890; 2,275,843 and 2,754,307, all of which are incorporated herein by reference.

Generally 1 to 10% of the hydroxyl groups of the styrene allyl alcohol copolymer is esterified with a modified drying oil.

The esterified styrene allyl alcohol copolymers are prepared by co-reacting the copolymer with a rosin material and a modified drying or semi-drying oil. Alternatively, the rosin material, an olefinic dicarboxylic acid or anhydride thereof and an unmodified drying oil can be reacted together first and than reacted with the styrene allyl alcohol copolymer. The latter method is preferred.

The necessary proportions of modified drying oil and rosin material may be readily determined by a chemist from quanitative analysis data expressed in milliequivalents of carboxyl and hydroxyl groups per unit weight of rosin material, modified drying oil and styrene allyl alcohol copolymer, respectively.

The esterification reaction in detail may be affected to the desired degree of esterification at temperatures of from 160°C. to about 225°C. without significant disruption of the hydroxyl groups. However, prolonged heating at higher temperatures is apt to result in a loss of hydroxyl groups from the copolymer. Thus, it is preferred to avoid the use of reaction temperatures above about 225°C. although temperatures of up to about 325°C. may be employed if desired. The reaction may be terminated short of completion merely by ceasing to heat, by quenching or by other conventional techniques. The esterification may be conducted in the presence of any inert hydrocarbon such as xylene mineral spirits. However, the use of such solvent is optional since the esterification proceeds satisfactorily in the absence of solvents.

The esterified styrene allyl alcohol copolymer of this invention has a melting point from 115° to 160°C., preferably 135° to 145°C. and an acid value of from about 70 to 225, preferably from 155 to 175.

As mentioned, the binder of this invention comprises a major amount of the esterified styrene allyl alcohol copolymer. A major amount is at least 50 percent by weight. It is preferred that the binder contain at least 60 percent and more preferably, at least 80 to 95 percent by weight based on the total weight of the binder.

Other ingredients may be present in minor amounts, such as antifoaming agents, acids and the like. Antifoaming agents include: esters of phosphoric acid, high molecular weight alcohols and silicone compounds. Examples of esters of phosphoric acid include the alkyl phosphates having 1 to 10, preferably 1 to 5, carbon atoms in the alkyl group such as triethyl phosphate, tributyl phosphate, tripentyl phosphate and dibutyl hydrogen phosphate. Examples of silicone compounds include: dimethyl silicone fluids as described in *Kirk-Othmer Encyclopedia of Chemical Technology*, Volume 12, pp. 392 to 412, The Interscience Encyclopedia, Inc., 1954, which is incorporated herein by reference. They are present generally in an amount of from about 0.5 to about 7 percent by weight based on the total weight of the binder.

Examples of acids include: sulfuric, hydrochloric and oxalic acid. They are generally used in catalytic amounts.

As mentioned, the novel binders of this invention are used in water based flexographic and gravure inks and in the vehicles for such inks. Generally these vehicles contain a binder of this invention, water and an alkaline volatile base.

Generally, the binder is present in an amount of from about 15 percent to about 22 percent, preferably from about 17 percent to about 20 percent by weight, based on the total weight of the vehicle.

Water is present in an amount of from about 40 percent to about 53 percent, preferably from about 40 percent to about 45 percent, based on the total weight of the ink vehicle.

The preferred volatile base or alkaline material is ammonia because it is relatively inexpensive compared with other volatile bases and also because it is readily evaporated when the ink film dries. Other volatile bases include any of the lower alkyl amines, such as methyl amine, dimethyl amine, trimethyl amine, monoethanolamine, ethyl amine, diethyl amine, triethyl amine, and the like. The volatile base must be present in sufficient amount to maintain a slight alkalinity in the ink. A pH range of 7.5 to 8.5 is satisfactory with a pH of 7.8 to 8.3 being preferred.

In the case of ammonia or morpholine it is present in an amount of from about 12 percent to about 30 percent, preferably from about 15 percent to about 25 percent by weight, based on the weight of the resin solids.

The percentage of volatile base should be kept as low as possible to minimize the affect of such materials on the copper cylinders used in gravure printing.

Likewise, various other ingredients may be added to the ink vehicle in minor amounts, such as antifoam agents.

The inks of this invention comprise the above-mentioned vehicle, water and pigment. The vehicle is present in an amount of from about 55 percent to about 70 percent, preferably from about 60 percent to about 65 percent by weight, based on the total weight of the ink.

The pigments that may be used include carbon black, titanium dioxide, red pigment, melon blue, and the like.

The amount of pigment employed will be that ordinarily used to provide inks of the desired color and viscosity. Usually the pigment will be a proportion of from about 2% to about 60% by weight based on the total weight of the ink. In the case of carbon black, the amount will be from about 2% to about 31% by weight, based on the total weight of the ink, preferably from about 9% to about 31%.

Water is present in the inks of this invention in an amount of from about 15 percent to about 30 percent, preferably from about 20 percent to about 25 percent, based on the total weight of the ink.

Other ingredients may be present in minor amounts in the inks such as wax.

Wax is present generally in an amount of from about 1.0 percent to about 3.0 percent, based on the total weight of the ink.

The inks of this invention have a viscosity of from about 23 seconds to about 30 seconds, preferably from about 23 seconds to about 25 seconds as determined using a No. 3 Zahn Cup.

The invention will now be illustrated by the following examples.

EXAMPLE I

To a suitable reaction vessel was added 1665 kg. of gum rosin, 740 kg. of tall oil rosin and 0.55 kg. of oxalic acid. This mixture was then heated to 176°C. Next was added 673 kg. of fumaric acid and 181 kg. of Castung 235 tung oil. This was heated to 210°C. and held for 1¼ hours. To this was added 50 grams of DCA*, 148 kg. of tributyl phosphate, and 795 kg. of a styrene allyl alcohol, comprised of about 70 percent by weight of styrene, and correspondingly, a theroetical 30 percent by weight of allyl alcohol and having an actual hydroxyl group content of about 6.4%. The temperature was heated to 218°C. and held there for one hour. The product so recovered had a melting point of about 135 to 145°C. and an acid value of 155 to 175.

*Dow-Cornning Antifoam

EXAMPLE II

An ink vehicle was prepared containing the following ingredients: water, 50.80%, morpholine, 5.0%; ammonia, 4.0%; antifoam emulsion, 0.20%; binder of Example I, 30.0%. The pH of this mixture was 7.8.

EXAMPLE III

An ink was prepared containing the following: vehicle of Example II, 68.9%; water, 10%; antifoam emulsion, 0.10%; powdered wax, 1.0%; black pigment, 20%. The solids were 20.67%. The black pigment was dispersed in the vehicle used in a ball mill.

The ink of Example III and a similar ink prepared using an acrylic binder containing 20.67% of solids were tested as follows.

DRYING TEST

Ink of Example III and ink based on acrylic resin were reduced with water to get a viscosity reading of 25 seconds in No. 2 Zahn cup. Using an Anilox hand proofer, they were applied to corrugated liner board at the same time. The printed film was immediately given a blast of hot air and checked for solvent release. The ink based on Example III released the water from the printed film faster than that based on the acrylic resins.

ADHESION TEST

Scotch brand tape was placed on each ink film. When the tape was lifted, both inks showed good ability to adhere to the corrugated liner board.

FOAM TEST

Each ink was agitated until they developed severe foam. After agitation, inks were observed for determination of their ability to regain original stage. The ink of Example III produced less foam and required very little additional defoaming agent to bring it back to original stage. The acrylic based ink required much more defoamer to control it.

DRY RUB TEST

Inks applied to corrugated liner board were allowed to air dry for 12 hours. Using bleached paper with rough finish, each ink was given 40 strokes with equal pressure. Both inks exhibited good dry rub properties. WRT Inks were applied to low porosity liner board and glassine stock. The printed substrates were sandwiched in a book and allowed to stand for 24 hours. The printed films were emerged in water for 30 minutes and checked for color smear while wet. The ink based on Example III was equal to the ink based on acrylics in that both exhibited very slight color smear.

From a consideration of the above specification, it will be understood that many improvements and modifications in the details may be made without departing from the spirit and scope of the invention. It is to be understood, therefore, that the invention is not limited except as defined by the appended claims which constitute part of the description of the present invention and are to be considered as such.

What is claimed is:

1. A binder for water base flexographic or gravure inks comprising a major amount of an ester of a copolymer of an ethylenically unsaturated alcohol and a styrene monomer; said esterified copolymer being a copolymer of:
   a. an ethylenically unsaturated alcohol selected from the group consisting of allyl alcohol, methallyl alcohol and mixtures thereof, and
   b. styrene monomer selected from the group consisting of styrene, alpha- and beta-substituted styrene, mono- and di-alkyl, chloro and chloroalkyl styrene and mixtures thereof; wherein said copolymer before esterification has a hydroxyl group content of from about 4–7.5 percent by weight;

from 50 to 85 percent of said hydroxyl groups being esterified with
   c. a rosin material, and from 1 to 10 percent of said hydroxyl groups being esterified with
   d. a modified drying oil;

said binder having an acid number of from 70 to 225 and a melting point of from about 115° to 160°C.

2. A binder according to claim 1 wherein the drying oil is castor oil or tung oil, the styrene monomer is styrene and the alcohol is allyl alcohol.

3. A resinous binder according to claim 2 wherein said binder additionally contains an antifoaming agent.

4. A binder according to claim 2 wherein the rosin material is fumaric acid fortified tall oil rosin, a fumaric fortified gum rosin, or mixtures thereof.

5. A resinous binder according to claim 2 which additionally contains tributyl phosphate as an antifoaming agent.

6. A binder for water base flexographic or gravure inks consisting essentially of
   1. an ester of a copolymer of allyl alcohol and styrene; said copolymer before esterification having a hydroxyl group content of from about 4–7.5 percent by weight with from 50 to 85 percent of said hydroxyl groups being esterified with a mixture of fumaric fortified gum rosin and fumaric fortified tall oil rosin, and from about 1 to about 10 percent of said hydroxyl groups being esterified with tung oil, and
   2. an antifoaming agent or mixture of anti-foaming agents.

7. A binder according to claim 6 wherein the antifoaming agent is tributylphosphate.

8. A ink vehicle for flexographic and gravure printing inks comprising water in an amount of from about 45 percent to about 53 percent by weight; the binder of claim 1 in an amount of from about 15 percent to about 22 percent, and a volatile base in an amount to provide a pH of from about 7.5 to 8.5.

9. A printing ink for gravure and flexographic printing comprising the ink vehicle of claim 4 in an amount of from about 55 to 70 percent by weight, water in an amount of from about 15 to 30 percent, and pigment in an amount of from about 2 to 60 percent by weight.

* * * * *